United States Patent [19]

Hromatka et al.

[11] 3,872,089

[45] Mar. 18, 1975

[54] SUBSTITUTED THIENODIAZEPINES

[75] Inventors: Otto Hromatka; Dieter Binder, both of Vienna, Austria

[73] Assignee: Hoffman-La Roche Inc., Nutley, N.J.

[22] Filed: May 5, 1972

[21] Appl. No.: 250,701

[30] Foreign Application Priority Data
May 14, 1971 Switzerland.......................... 7303/71
Mar. 29, 1972 Switzerland.......................... 4664/72

[52] U.S. Cl..... 260/239.3 T, 260/332.2, 260/332.3, 424/244, 424/275
[51] Int. Cl. ...................... C07d 53/02, C07d 63/18
[58] Field of Search ............... 260/239.3 B, 239.3 D

[56] References Cited
UNITED STATES PATENTS

| | | | |
|---|---|---|---|
| 3,270,053 | 8/1966 | Reeder et al. ................ | 260/239.3 D |
| 3,299,053 | 1/1967 | Archer et al. ................. | 260/239.3 D |
| 3,376,290 | 4/1968 | Fryer et al. ................... | 260/239.3 D |
| 3,391,138 | 7/1968 | Archer et al. ................. | 260/239.3 D |
| 3,558,606 | 1/1971 | Tinney ......................... | 260/239.3 T |
| 3,669,959 | 6/1972 | Hromatka et al. ............. | 260/239.3 B |

FOREIGN PATENTS OR APPLICATIONS

| | | | |
|---|---|---|---|
| 1,961,727 | 9/1970 | Germany...................... | 260/239.3 B |
| 2,107,356 | 8/1971 | Germany...................... | 260/239.3 B |

OTHER PUBLICATIONS

Yale "J. Med. and Pharm. Chem." Vol. 1, No. 2, pages 121-133 (1959)

Zbinden et al. "Advances in Pharmacology" Vol. 5 pages 250–261 (Academic Press) (1967)

Sternbach et al. "Some Aspects of Structure–Activity Relationship in Psychotripic Agents of the 1,4-Benzodiazepine Series" A Symmposium Held at the Regional Research Laboratory, Hyder Bad, India, CSIR New Delhi, India (1966)

*Primary Examiner*—Henry R. Jiles
*Assistant Examiner*—Robert T. Bond
*Attorney, Agent, or Firm*—Samuel L. Welt; Bernard S. Leon; Frank P. Hoffman

[57] ABSTRACT

5-Substituted-phenyl-thienodiazepines bearing a halogen or nitro substituent on the thieno ring are disclosed together with processes for their preparation and novel intermediates employed in these processes. These novel thienodiazepines are useful as muscle relaxants and sedatives.

4 Claims, No Drawings

SUBSTITUTED THIENODIAZEPINES

DETAILED DESCRIPTION OF THE INVENTION

The present invention relates to diazepine derivatives. More particularly, the present invention relates to thienosubstituted-thienodiazepine derivatives and to processes for preparing the foregoing.

The thienodiazepine derivatives of the present invention are of the formula

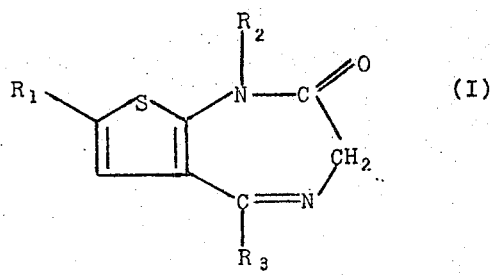

wherein $R_1$ represents halogen or nitro, $R_2$ represents hydrogen or —$CH_2$-X wherein X represents hydrogen, lower alkyl, lower alkenyl, $C_3$-$C_4$ cycloalkyl, hydroxymethyl, methoxy or a dilower alkylamino lower alkyl group containing no more than 5 carbon atoms and $R_3$ represents o-halophenyl, o-trifluoromethylphenyl, 0,0'-dihalophenyl and o-nitrophenyl provided however that when $R_1$ is nitro, $R_3$ is other than an o-nitrophenyl group, and the salts thereof, preferably pharmaceutically acceptable addition salts thereof.

As used herein, either alone or in combination with another radical, the term "lower alkyl" refers to straight or branched chain saturated hydrocarbon groups containing 1-4 carbon atoms. Ther term "lower alkenyl" as used herein refers to straight or branched chain hydrocarbon groups which contain an olefinic double bond and no more than 4 carbon atoms. Unless expressly stated otherwise, the term "halogen" is intended to encompass all four halogens, i.e. fluorine, chlorine, bromine and iodine.

When $R_1$ represents a halogen atom, chlorine, bromine and iodine are preferred with chlorine being particularly preferred. When $R_3$ represents o-halophenyl, the groupings o-fluorophenyl and o-chlorophenyl are preferred. When $R_3$ represents an o,o'-dihalophenyl group, the halogen atoms are preferably the same, with o,o'-difluorophenyl being especially preferred. $R_2$ preferably represents hydrogen, methyl allyl, cyclopropylmethyl, hydroxyethyl, methoxymethyl or 2-diethylaminoethyl. $R_2$ in the most preferred aspect is hydrogen or methyl.

A particularly preferred compound encompassed by the formula I above is:

7-chloro-1,3-dihydro-5-(o-nitrophenyl)-2H-thieno [2,3-e][1,4]diazepin-2-one. Included among the other preferred compounds of the formula I are:
5-(o-chlorophenyl)-1,3-dihydro-7-iodo-2H-thieno[2,3-e][1,4]diazepin-2-one;
7-chloro-5-(o-fluorophenyl)-1,3-dihydro-2H-thieno-[2,3-e][1,4]diazepin-2-one;
7-chloro-5-(2,6-difluorophenyl)-1,3-dihydro-2H- thieno-[2,3-e][1,4]diazepine-2-one;
7-chloro-1,3-dihydro-1-methyl-5-(o-nitrophenyl) -2-H-thieno[2,3-e][1,4]diazepin-2-one;
5-(o-chlorophenyl)-1,3-dihydro-7iodo-1-methyl -2-H-thieno[[2,3-e][1,4]diazepin-2-one;
5-(o-chlorophenyl)-1,3-dihydro-1-methyl-7-nitro -2-H-thieno[2,3-e][1,4]diazepin-2-one and
7-chloro-1,3-dihydro-1-methyl-5-(o-trifluoromethylphenyl)-2H-thieno[2,3-e][1,4]diazepin-2-one.

The compounds of the formula I above can be prepared in one prepartive apprach by halogenating or nitrating a compound of the general formula

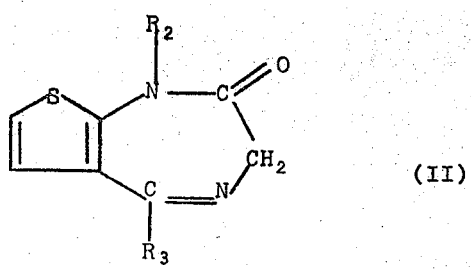

wherein $R_2$ and $R_3$ are as above whereby to provide a halogen or nitro group in position-7.

Compounds of the formula I above can also be prepared by cyclizing a compound of the formula

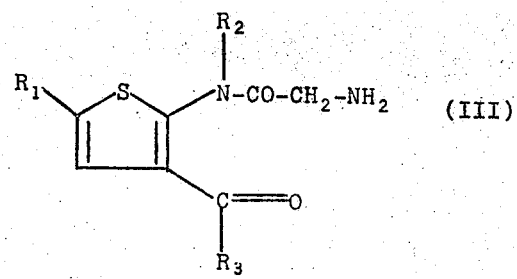

wherein $R_1$, $R_2$ and $R_3$ are the above.

Compounds of the formula I above wherein $R_2$ is -$CH_2$X can be prepared by treating a compound of the formula I above which is unsubstituted in position-1; that is to say, a compound of the formula I wherein $R_2$ is hydrogen, i.e. a compound of the general formula

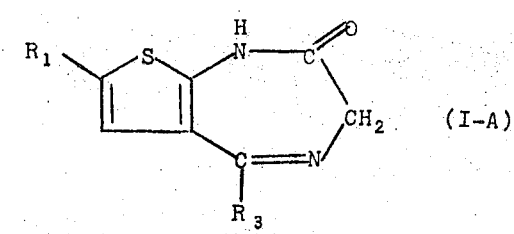

wherein $R_1$ and $R_3$ are as above with a reagent capable of providing a -$CH_2$X grouping.

According to one process aspect of the present invention, a compound of formula I wherein $R_1$ is halogen or nitro can be prepared by halogenating or nitrating the corresponding compound of formual II.

The halogenation of a compound of formula II is effected utilizing elemental chlorine, bromine or iodine, sulfuryl chloride and similar halogenating agents. The reaction conditions employed can be selected by one of ordinary skill in the art and is dependent upon the halogenating agent utilized in accordance with prior art procedures.

Chloroination of a compound of the formula II above whereby to provide the corresponding compound of the formula I wherein $R_1$ is chlorine can be effected utilizing elemental chlorine, for example, in the presence of chloroform/pyridine at room temperature or at elevated temperatures. Bromination utilizing elemental bromine can be effected, for example, in the presence of chloroform at an elevated temperature, for example, under reflux conditions. Iodination utilizing elemental iodien can be effected, for example, in the presence of chloroform and mercuric oxide at room temperature. Chlorination utilizing sulfuryl chloride can be effected, for example, in the presence of chloroform or glacial acetic acid at room temperature or at an elevated temperature, for example, at about the reflux temperature of the reaction mixture.

Nitration of a compound of the formula II above can be effected according to conventional procedures. For example, nitration can be effected utilizing nitric acid or an alkali nitrate in the presence of sulfuric acid. Thus, a compound of formula II can be dissolved in concentrated sulfuric acid and the solution so-obtained is thereafter carefully treated with a mixture of concentrated nitric acid and concentrated sulfuric acid. The nitration of a compound of the formula II above is preferably effected at low temperatures, for example at a temperature of from about −10°C. to about +10°C.

According to a further process aspect of the present invention, the compounds of formula I above can be prepared by cyclizing a compound of formula III above.

The cyclization of a compound of formula III above to the corresponding compound of the formula I above can be effected by heating a compound of the formula III above in an organic medium. Preferrably, the cyclization is effected in the presence of an acid. An acid insures that satisfactory yields are obtained. Thus, the cyclization can be effected, for example, by heating a compound of formula III above under reflux conditions over a period of several hours in the presence of lower aliphatic carboxylic acids such as acetic acid in a lower alkanol such as ethanol or n-propanol, or for relatively short periods of time (ca 5 minutes to 0.5 hour) in the presence of a lower aliphatic carboxylic acid such as acetic acid, isobutyric acid or pivalic acid.

The compounds of formula III need not be isolated from the reaction medium in which they are prepared prior to the cyclization thereof. Indeed, in certain cases, isolation thereof is quite difficult as compounds of the formula III above evidence the propensity to spontaneously cyclize under the conditions used for the preparation thereof.

Thus, the compounds of the formula III above can be converted to compounds of the formula I above with or without isolation from the reaction medium in which they are prepared.

According to another process aspect of the present invention, the compounds of formula I which are substitued in the 1-position by a group of the formula -$CH_2$-X are prepared by appropriately by substituting in the 1-position a corresponding compound which is unsubstituted in the 1-position, i.e. a compound of formula I-A.

The introduction of a group of the formula -$CH_2$-X into a compound of formula I-A can be carried out according to conventional methods. For example, a compound of the formula I-A above is converted into the corresponding alkali metal derivatie thereof (for example, utilizing an alkali metal lower alkoxide such as sodium methoxide, an alkali metal hydroxide such as sodium hydroxide, an alkali metal hydride such as sodium hydride, an alkali metal amide such as sodium amide and the like) and thereafter reacting the so-obtained alkali metal derivative, which need not be isolated, with a suitable alkylating agent. For example, a suitable alkylating agent is of the formula $$Y-CH_2-X \qquad (IV)$$

wherein X is as above and Y represents a suitable leaving group.

A suitable leaving group can be represented, for example, by chlorine, bromine, iodine, alkylsulfonyloxy, e.g. methanesulfonyloxy and arylsulfonyloxy, e.g. benzensulfonyloxy, p-toluenesulfonyloxy and bromobenzenesulfonyloxy and the similar type leaving groups. A groupd of the formmula X-$CH_2$-$SO_4$- is another suitable leaving group, especially when X represents a hydrogen atom or lower alkyl group containing 1 to 4 carbon atoms. Examples of compounds of formula IV which can be used in this process aspect are lower alkyl halides (e.g. methyl iodide), diloweralkylsufates (e.g. dimethylsulfate) lower alkenylhalides (e.g., allyl bromide), cycloalkylmethyl halides, (e.g. cyclopropylmethylbromide), 2-haloethanols (e.g. 2-bromoethanol), halodiloweralkyl ethers (e.g chlorodimethyl ether), dilower alkylamino lower alkyl amino halides (e.g diethylaminoethyl chloride) and the like.

The introduction of a group of the formula -$CH_2$-X is expeditiously effected in the presence of an organic solvent at room temperature, preferably at a temperature of from about 0°C. to about 30°C. The introduction can be effected, for example, by adding a compound of formula I-A in the calculated amount to an alcoholic alkali metal alkoxide solution (for example, methanolic sodium methoxide solution), evaporating off the solvent, taking up the thus-obtained 1-alkali metal derivative of the compound of formula I-A in a suitable inert organic solvent (preferably a polar solvent such as dimethylformamide) and adding the alkylating agent containing the grouping $CH_2$-X which it is desired be introduced.

The preparation of an alkali metal salt of a compound of formula I-A and the reaction thereof with an alkylating agent can, however, as mentioned earlier, also be carried out without isolation of the alkali metal salt derivative which is first prepared. In this preparative approach, a compound of the formula I-A above can be treated in an inert organic solvent with an alkali metal alkoxide or an alkali metal hydride and to the resultant reaction medium, there can be added the appropriate alkylating agent. Suitable solvents for this procedure are, for example, dimethylformamide and aromatic hydrocarbons such asbenzene, toluene and the like. Dimethylformamide is preferably utilized as the solvent medium.

Compounds of formula I can be converted into pharmaceutically acceptable acid addition salts thereof by treatment with appropriate organic and inorganic acids. Examples of acid which form pharmaceutically acceptable salts with compounds of the formula I above are hydrochloric acid, hydrobromic acid, sulfuric acid, methanesulfonic acid, benzenesulfonic acid, p-toluenesulfonic acid and the like. Compounds of the formula I above wherein $R_2$ represents a hydrogen atom can be converted into alkali metal derivatives; for example, into sodio derivatives whereby a sodium salt can be obtained. Included within the purview of this invention, hence are the pharmaceutically acceptable acid addition salts of a compound of the formula I in addition to the alkali metal salts thereof formed by the addition of compounds of the formula I above wherein $R_2$ is hydrogen to an alkali metal providing reagent.

The starting materials of formulae II and III can be prepared in accordance with the following diagrammatical flow sheet wherein $R_1$, $R_3$ and X have the significance given above and Z represents a carbobenzoxyamino group:

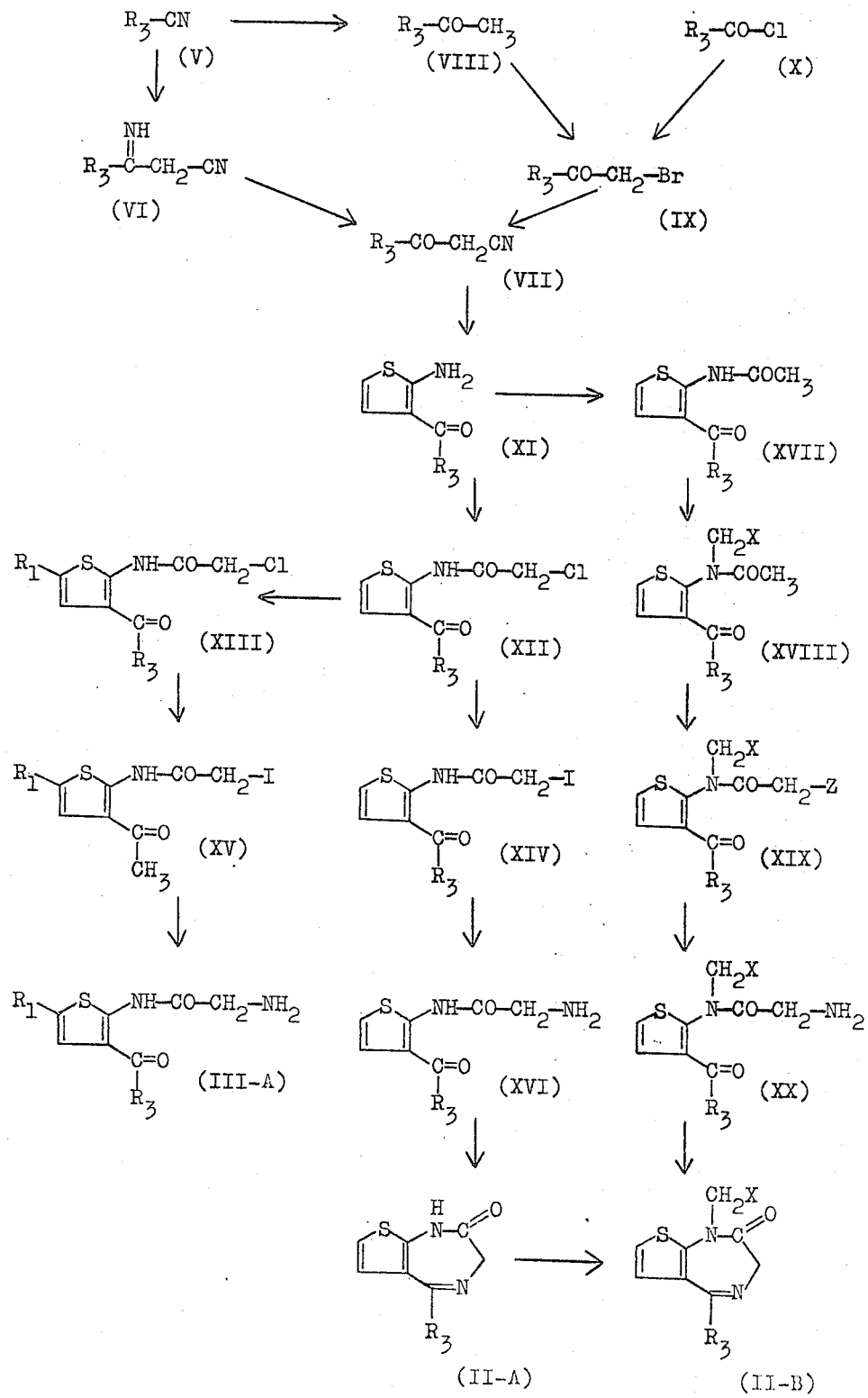

Having regard to the foregoing formula scheme, a nitrile of the formula V above, which can be obtained, for example, from a corresponding aniline derivative by a Sandmeyer reaction, is converted by treatment with acetonitrile and sodium (for example, in boiling benzene) into a compound of the formula VI above which, by hydrolysis (for example, using concentrated hydrochloric acid), yields a phenacyl cyanide of formula VII above. A nitrile of formula V above can also be converted by a Grignard reaction (for example, using methyl magnesium bromide) and subsequent hydrolysis into a methyl ketone of the formula VIII above. A compound of the formula VIII above can be brominated in the methyl group (for example, using bromine in chloroform in the presence of a trace of aluminum chloride) and the so-obtained compound of the formula IX above can be converted into a phenacyl cyanide of the formula VII above, for example, by warming in an aqueous-alcoholic potassium cyanide solution. Finally, a phenacyl bromide of the formula IX above can also be prepared from an acid chloride of the formula X above (e.g. using diazomethane and hydrogen bormide) and then, as described earlier, converted into a phenacyl cyanide of the formula VII above.

The preparation of an amino ketone of the formula XI above is carried out by reacting a phenacyl cyanide of the formula VII above the with α-mercaptoacetaldehyde which is present in solid form dimerically as 2,5-dihydroxy-1,4-dithiane. This reaction is carried out in the presence of a suitable organic solvent (e.g a lower alkanol such as ethanol, dimethylformamide or a cyclic ether such as dioxane) and a base (e.g. an amine such as triethylamine, piperdine, etc.) at an elevated temperature (e.g. at 50°–100°C).

Compounds of the formula XII above can be prepared by chloracetylating an amino ketone of formula XI in accordance with conventional procedures; for example, the compound of the formula XI can be chloroacylated with chloroacetyl chloride in the presence of a suitable solvent such as dioxane and a base such as postassium carbonate.

Compounds of formula XIII can be obtained by appropriately substituting (i.e. halogenating or nitrating) a compound of formula XII in the 5-position of the thiophene ring. This substitution can be carried out in an analogous manner to that described above in connection with the nitration or halogenation of a compound of the formula II.

In the preparation of a compound of the formulae XIV and XV above, the chlorine atom present in the side-chain of a corresponding chloroacetyl compound of the formula XII or XIII above is replaced by an iodine atom; for example, by heating a compound of the formulae XII and XIII above with sodium iodide in acetone (Finkelstein reaction).

Compounds of the formuale III-A and XVI above can be prepared by replacing the iodine atom present in the side-chain of a corresponding iodoacetyl compound of the formula XV or XIV above by an amino group. Such can be effected, for example, in liquid ammonia or in a mixture of an inert organic solvent such as methylene chloride and liquid or concentrated aqueous ammonia. The reaction is effected over a period of from several hours to a few days, depending upon the conditions employed.

Compounds of the formula II-A above can be prepared by cyclizing an amino compound of the formula XVI above in a manner analogous to that described above in connection with the cyclization of a compound of the formula III above to the corresponding compound of the formula I above.

Compounds of the formula II-A above can be appropriately substituted at the nitrogen atom in the 1-position to give compounds of the formula II-B above. The conversion of a compound of the formula II-A above into a compound of the formula II-B above is effected in an analogous manner as that described above in the conversion of a compound of the formula I above wherein $R_2$ is hydrogen into the corresponding compound of the formula I above wherein $R_2$ is -$CH_2$-X.

Compounds of formula II-B can also be prepared from the amino ketones of formula XI in the following manner:

An amino ketone is acetylated to give a compound of the formula XVII above which is subsequently substituted at the nitrogen atom thereof with a group of the formula -$CH_2X$. The substitution can be effected, for example, in an analogous manner to that described above when converting a compound of the formula I above wherein $R_2$ is hydrogen to the corresponding compound of the formula I above wherein $R_2$ is -$CH_2$-X. The acetyl group is then removed (e.g. by acid hydrolysis) from the resulting compound of formula XVIII and a carbobenzoxyglycyl group is introduced into the resulting compound (e.g. using carbobenzoxygylcyl chloride in the presence of a base such as potassium carbonate). There is thus obtained a compound of formula XIX from which the carbobenzoxy group is cleaved (e.g. by treatment with hydrogen bromide in glacial acetic acid) to give a compound of the formula XX above; however, a compound of the formula XX above is difficultly isolatable as it may spontaneously cyclize to the corresponding compound of the formula II-B above under the reaction conditions utilized in the preparation thereof. When X represents a hydroxymethyl group in the procedure described in this paragraph, it may be necessary to protect the hydroxy group by means of a suitable protecting group and to subsequently remove the protecting group at a suitable stage of the synthesis.

Compounds of the formula

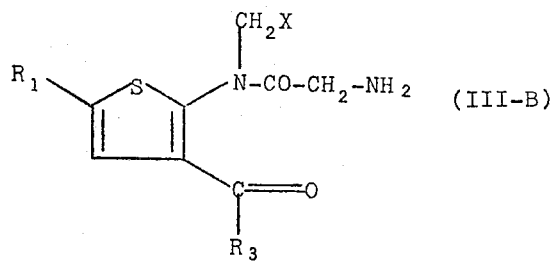

(III-B)

wherein $R_1$, $R_3$ and X have the significance given earlier.

can also be prepared if desired, by halogenating or nitrating any of the intermediates found in the diagrammatic flow sheet along suitable stages of the procedures illustrated therein.

The compounds of formulae II, III, XI to XVI and XX are novel and, hence, form part of the present invention.

The compounds of formula I and their pharmaceutically acceptable acid addition salts can be used as muscle relaxants and sedatives. Thus, for example, the compound 7-chloro-5-(o-chlorophenyl)-1,3-dihydro-2H-thieno[2,3-e][1,4]-diazepin-2-one exhibits in the rotating rod test (mouse)

an $HD_{50}$ of 20 mg/kg p.o., in the antipentetrazole test (mouse) an $APR_{20}$ of 14 mg/kg p.o and in the test for acute toxicity (mouse) an $LD_{50}$ of more than 5000 mg/kg p.o. In a similar manner, the compound 7-chloro- 1,3-dihydro-5-(o-nitrophenyl-2H-thieno[2,3-e][1,4]diazepine-2-one exhibits in the rotating rod test (mouse) an $HD_{50}$ of 5.7 mg/kg p.o., in the antipentetrazole test (mouse), and $APR_{20}$ of 3.3 mg/kg p.o. and in the test for acute toxicity (mouse) and $LD_{50}$ of more than 5000 mg/kg p.o. The aforementioned tests were carried out according to known methods.

The compounds of formula I and their pharmaceutically utilizable acid addition salts can be compounded according to conventional procedures into pharmaceutical preparations, for example, tablets, dragees, suppositories, capsules, solutions, suspensions, emulsions and the like. In addition to the customary pharmacologicaly inert carrier materials, such as, for example, lactose, starches, talc, magnesium stearate, water, vegetable oils, polyalkylene glycols and the like, these preparations can also contain preserving, stabilizing, wetting or emulsifying agnets, salts for varying osmotic pressure, buffers or other therepeutically valuable substances. If necessary, the preparations can be sterilized or subjected to other operations which are customary in the pharmaceutical industry.

A suitable pharmaceutical dosage unit can contain about 1 to 500 mg of a compound of the formula I. Suitable daily dosage for oral administration to mammals is in the range of from about 0.1 mg/kg to about 300 mg/kg. For parenteral administration to mammals, a suitable daily dosage is in the range of from about 0.1 mg/kg to about 10 mg/kg. However, it will be appreciatd that these dosages are given by way of example and the specific dosage must be adjusted to fit the exergencies of a pharmacological situation.

The following examples are illustrative but not limitative of the present invention. All temperatures are stated in degrees Centigrade.

EXAMPLE 1

5 g (0.0181 mol) of 5-(o-chlorophenyl)-1,3-dihydro-2H-thieno[2,3-e][1,4]diazepin-2-one is dissolved with stirring in 20 ml of glacial acetic and 3 ml of sulfuryl chloride are added dropwise. The mixture is then stirred for 2 hours at room temperature and neutralized with the calculated amount of sodium bicarbonate, whereupon the precipitating product is filtered off with suction and washed with water and methylene chloride. After crystallization from ethanol, there is obtained 7-chloro-5-(o-chlorophenyl)-1,3-dihydro-2H-thieno[2,3-e][1,4]diazepin-2-one in the form of white crystals of melting point 237°(with decommposition).

The starting material can be manufactured as follows:

a. In a 1 liter three-necked flask with stirrer and dropping funnel, 112 g (0.62 mol) of o-chlorophenacyl cyanide and 47.5 g (0.62 mol) of 2,5-dihydroxy-1,4-dithiane is suspended in 600 ml of absolute ethanol and warmed to 35°. 33 ml of triethylamine is then added slowly. The resulting mixture is warmed to 55° and the reaction mixture held for 20 hours at this temperature. The reaction mixture is then poured into 6 l of water and shaken up with methylene chloride. The organic phase is washed twice with dilute hydrochloric acid, once with water, twice with dilute caustis soda and again twice with water, dried over sodium sulfate, concentrated and brough to crystallization. The yellowish 2-amino-3-(o-chlorobenzoyl)thiophene crystallizes form ethanol with the addition of activated characoal; melting point 139°–141°.

b. 100 g of anhydrous potassium carbonate is suspended in a solution of 100 g (0.42 mol) of 2-amino-3-(o-chlorobenzoyl)-thiophene in 500 ml of absolute dioxane. 120 ml of chloroacetyl chloride is added in one portion with strong stirring, whereupon the temperature rises. It is left to stir for 2 hours, the cooled reaction mixture is poured into a solution of 150 g of potassium carbonate in 4 l of water and stirred for a further 2 hours. The separated yellow solid is filtered off by suction, washed neutral with water and dried at 50° in vacuum. After recrystallization from ethanol, there is obtained 2-chloroacetylanino-3-(o-chlorobenzoy)thiophene in the form of yellowish crystals of melting point 132°–134°C.

c. 127.8 g (0.4 mol) of 2-chloroacetylamino-3(o-chlorobenzoyl)-thiophene and 67.5 g of sodium iodide is heated for 1 hour in acetone under reflux. The reaction mixture is then evaporated in vacuum, whereupon the residue is partitioned between water and methylene chloride. The methylene chloride phase is separated off, dried over sodium sulfate, concentrated and brought to crystallization. There is obtained yellowish-colored 3-(o-chlorobenzoyl)-2-iodacetylaminothiophene which melts at 89°–92° after crystallization form ethanol.

d. 25 g (0.06 mol) of 3-(o-chlorobenzoyl)-2-iodoacetylamino-thiophene is dissovled in 300 ml of methylene chloride. The resultant medium is cooled to 50° and 265 ml of liquid ammonia is added to it. The mixture is stirred for 5 hours at -27°C. under reflux and the ammonia is then removed by suction by means of a water-jet pump, whereupon the residual organic solution is shaken up with water, dried over sodium sulfate, concentrated, treated with ether and shaken up several times with 0.5-normal hydrochloric acid. The hydrochloric acid phase is neutralized with sodium bicarbonate and shaken up several times with methylene chloride. The methylene chloride phase is dried, evaporated and brought to crystallization yielding lightyellow 2-aminoacetylamino-3-(o-chlorobenzoyl)thiophene of melting point 158°–160°.

e. 106 g (0.36 mol) of 2-aminoacetylamino-3-(o-chlorobenzoyl) thiophene is dissolved in 2.5 l of absolute ethanol. 6.5 Ml. of formic acid is then added and the mixture is heated for 20 hours under reflux. After the addition of activated charcoal, the mixture is further boiled for a further 10 minutes, filtered and evaporated to dryness in vacuum. The crude product is boiled with methylene chloride, the by-products going into solution and 5-(o-chlorophenyl)-1,3-dihydro-2H-thieno[2,3-e][1,4]diazepin-2-one remaining behind undissolved as a chromatographically pure white product. the mother-liquor is concentrated and brought to crystallization yielding further product. The product has a melting point of 222.5°–224.5° (after recrystallization from ethanol).

EXAMPLE 2

0.0725 g (0.0025 mol) of 5-(o-chlorophenyl)-1,3-dihydro-1-methyl-2H-thieno[2,3-e][1,4]diazepin-2-one is dissovled in 20 ml of absolute chloroform and 0.5 ml of sulfuryl chloride in 3 ml of absolute chloroform are added dropwise. The mixture is firstly stirred for half an hour in the cold, subsequently heated for 10 minutes under reflux and thereupon shaken with sodium bicarbonate. The organic phase is dired over sodium sulfate and concentrated. The accuring oil can be brought to crystallization with the aid of ether. After recrystallization from cyclohexane, there is obtained 7-chloro-5-(o-chlorphenyl)-1,3-dihydro-1-methyl-2H-thieno-[2,3-e][1,4]diazepin-2-one in the form of white crystals of melting point 83°–85°.

The starting product can be manufactured as follows:

5 g (0.018 mol) of 5-(o-chlorophenyl)-1,3-dihydro-2H-thieno [2,3-e][1,4]diazepin-2-one is dissolved in 18.8 ml of 1N methanolic sodium methylate solution. The resulting solution is evaporated to dryness in vacuum. The residue is taken up in 29.3 ml of absolute dimethylformamide and treated with 2.64 g of methyl iodide. A clear solution results with slight warming. After standing for 2 hours, the reaction mixture is concentrated in vacuum, treated with water and shaken up several times with methylene chloride. The organic phase is shaken up several times with 0.5-N caustic soda, washed neutral with water, dried and evaporated. The residue is brought to crystallization by treatment with some ether. By recrystallization from cyclohexane/ethanol, there is obtained 5-(o-chlorophenyl)-1,3-dihydro-1-methyl-2H-thieno-[2,3-e][1,4]diazepin-2-one in the form of white crystals of melting point 112°–114°.

EXAMPLE 3

1 g of 5-(o-chlorophenyl)-1,3-dihydro-2H-thieno[2,3-e][1,4-diazepin-2-one is dissolved in 30 ml of hot abs. cholorform. 0.66 G of bromine dissolved in 30 ml of chloroform is then carefully added with stirring and with boiling at reflux. The mixture is boiled, after addition is completed, for a further 15 minutes under reflux. The mixture is thereafter shaken neutral with an aqueous solution of sodium bicarbonate and sodium thiosulfate, whereupon the organic phase is separated off, dried and evaporated. The residue is recrystallized from ethanol, yielding 7-bromo-5-(o-chlorophenyl)-1,3-dihydro-2H-thieno[2,3-e][1,4]-diazepin-2-one of melting point 248° (decomposition).

EXAMPLE 4

0.5 g of 5-(o-chlorophenyl)-1,3-dihydro-2H-thieno[2,3-e][1,4]diazepin-2-one is dissolved in 15 ml of absolute chloroform. There are now added alternately in small portions with stirring at room temperature a total of 0.33 g of yellow mercuric oxide and 0.49 g of iodine, whereupon the mixture is stirred for a further 10 minutes, then filtered off by suction from the mercuric oxide and rinised with hot chloroform. The chloroform phase is shaken neutral with a solution of sodium bicarbonate and sodium thiosulfate, dried and evaporated. The crystalline residue is recrystallized from dioxane yielding 5-(o-chlorophenyl)-1,3-dihydro-7-iodo-2H-thieno[2,3-e][1,4]-diazepin-2-one of melting point 214°–216°.

EXAMPLE 5

11.9 g of 5-(o-fluorophenyl)-1,3-dihydro-2H-thieno[2,3-e]-[1,4]diazepin-2-one dissolved in 120 ml of glacial acetic acid is carefully added at room temperature with stirring to a solution of 36 ml of sulfuryl chloride in 120 ml of glacial acetic. The resulting mixture is stirred for an additional half hour. The glacial acetic acid is thereafter distilled off in vacuum at 25° and the residue neutralized with a saturated sodium hydrogen carbonate solution. The precipitate formed is filtered off, washed and dried. The brown powder obtained is extracted with boiling with methylene chloride and recrystallized from ethanol yielding 7-chloro-5-(o-fluorophenyl)-1,3-dihydro-2H-thieno[2,3-e][1,4]diazepin-2-one of melting point 256°–259°.

The starting material can be manufactured as follows:

a. 10.9 g of sodium is finely partitioned in 180 ml of boiling absolute xylene by means of a Hershberg stirrer. After cooling, the xylene is replaced by 300 ml of absolute benzene and the resulting medium heated to boiling. A mixture of 27.6 g of o-fluorobenzonitrile, 20.5 g of acetonitrile and 120 ml of absolute benzene is rapidly added dropwise in such a way that the solution remains at a boil without further heating. It is thereafter boiled for 4 hours at reflux and stirred overnight at room temperature. The light-brown precipitate is filtered off, washed with absolute benzene and stirred into 300 ml of ether. Water is added slowly to this until the precipitate dissolves and an aqueous phase forms. The ethereal phase is separated off, dried and evaporated. o-Fluorobenzoacetodinitrile is isolated from the residue by distillation at 0.3 mm Hg and 135°.

b. 22.6 G of o-fluorobenzoacetodinitrile is dissolved with shaking and cooling in 70 ml of concentrated hydrochloric acid. The white precipitate which is formed after a few minutes is filtered off, washed with water and dissolved in methylene chloride. The solution obtained is dried with sodium sulfate, filtered and evaporated yielding o-fluorophenacyl cyanide of melting point 53°. A further portion of o-fluorophenacyl cyanide is obtained by diluting the hydrochloric acid filtrate and agitating with methylene chloride.

c. 20.9 G of o-fluorophenacyl cyanide is dissolved in 53 ml of absolute ethanol and 9.7 g of 2,5-dihydroxy-1,4-dithiane is stirred into this solution. 5.3 Ml of triethylamine is rapidly added dropwise with continued stirring in such a way that the temperature does not rise above 50°. The medium is then stirred for a further 15 hours at 50°. The resulting solution is cooled and filtered. The filtrate is stirred with activated charcoal, filtered and taken up in the four-fold amount of 1-N hydrochloric acid and methylene chloride. The organic phase is separated off, washed neutral with 1-N hydrochloric acid, then with water, twice with 1-N caustic soda and again with water (containing a little acetic acid). The organic solution is evaporated, whereupon the residue is digested with as little methylene chloride as possible. 2-Amino-3-(o-fluorobenzoyl)thiophene is obtained in the form of light-yellow crystals which melt, after recrystallization from benzene, at 144°–146°.

d. 16.7 G of 2-amino-3-(o-fluorobenzoyl)thiophene is dissolved in 85 ml of absolute dioxane, 15 g of anhydrous potassium carbonate is stirred in and 26 ml of chloroacetyl chloride is added in one portion. The mixture is stirred for one hour at room temperature and thereafter poured into a solution of 30 g of potassium carbonate in 850 ml of water. The separated oil is brought to crystallization; the precipitate is filtered off, dissolved in methylene chloride and dried with sodium sulfate. By evaporating off the solvent, there is obtained 2-chloroacetylamino-3-(o-fluorobenzoyl)thiophene which can be used for the further reaction as the crude product. The colorless crystals melt, after recrystallization from ethanol, at 94°–96°.

e. 22.1 g of 2-chloroacetylamino-3-(o-fluorobenzoyl)thiophene are boiled at reflux for one hour in 220 ml of acetone with 13.3 g of sodium iodide. The solvent is evaporated off in vacuum, the residue partitioned between methylene chloride and water containing some sodium thiosulfate, the original phase separated off and evaporated. The 3-(o-fluorobenzoyl)-2-iodacetylaminothiophene obtained can be employed in the next step without further purification. The melting point is after recrystallization from ethanol, 149°–151°.

f. 28.2 g of 3-(o-fluorobenzoyl)-2-iodacetylaminothiophene is dissolved in 280 ml of methylene chloride. The solution overlaid with 280 ml of concentrated aqueous ammonia and stirred slowly for two and a half days in such a way that the two layers do not intermix. The organic phase is thereafter washed neutral and extracted with 0.2-N hydrochloric acid. The hydrochloric acid solution is neutralized with sodium hydrogen carbonate and the 2-aminoacetylamino-3-(o-fluorobenzoyl)thiophene set free is extracted with methylene chloride. After recrystallization from methylene chloride, the colorless crystals melt at 128°–129°.

g. 14.3 G of 2-aminoacetylamino-3-(o-fluorobenzoyl)-thiophene are boiled at reflux for 15 minutes in 286 ml of glacial acetic acid. The glacial acetic acid is distilled off in vacuum and the residue is taken up in 0.2-N hydrochloric acid and benzene. The hydrochloric acid phase is washed several times with benzene and neutralized with sodium hydrogen carbonate, whereupon the resulting precipitate is shaken up with methylene chloride. There is obtained 5-(o-fluorophenyl)-1,3-dihydro-2H-thieno[2,3-e][1,4]diazepin-2-one of melting point of 196°–199°. (after recrystallization from ethanol).

EXAMPLE 6

A solution of 1.72 g of 5-(2,6-difluorophenyl)-1,3-dihydro-2H-thieno[2,3-e][1,4]diazepin-2-one in 15 ml of glacial acetic acid is added dropwise at 20° to a solution of 4.5 ml of sulfuryl chloride in 15 ml of glacial acetic acid. After completed addition, the resulting mixture is stirred for a further 2 hours at room temperature and then concentrated in vacuum. The concentrated solution is neutralized with sodium bicarbonate solution and extracted with methylene chloride. The methylene chloride solution is dried and evaporated. The crystalline evaporation residue consists of crude 7-chloro-5-(2,6-difluorophenyl)-1,3-dihydro-2H-thieno[2,3-e][1,4]diazepin-2-one. The product can be crystallized from ethanol as colorless needles of melting point 245°–247°.

The starting material can be manufactured as follows:

a. 46 G of 2',6'-difluoroacetophenone is dissolved in 110 ml of absolute chloroform and a spatula tip of anhydrous aluminum chloride is added. The resultant mixture is warmed to 40° and a solution 47 g of bromine in 250 ml of absolute chloroform is added dropwise within one hour. After completed addition, the mixture is allowed to stand for a further 10 minutes and then evaporated in vacuum. The residual light-brown oily 2-bromo-2',6'-difluoroacetophenone is dissolved in 235 ml of ethanol and treated with stirring with a solution of 59 g of potassium cyanide in 180 ml of water. The turbid mixture is warmed to 50° and held for 1 hour at this temperature. The solution which is now clear is treated with about 1 liter of water, stirred with activated charcoal and filtered. After it has been once more stirred with some activated charcoal and filtered, the filtrate is acidified with conc. hydrochloric acid, there precipitating 2,40´,6'-difluorophenacyl cyanide with melting point 54°–55°. Recrystallization from ether does not raise the melting point. By extracting the aqueous-acidic phase with ether, yet a further portion of 2,40,-difluorophanacyl cyanide can be obtained.

b. 34 G of 2',6'-dichlorophenacyl cyanide is dissolved in 80 ml of dimethylformamide, treated with 14.5 g of 2,5-dihydroxy-1,4-dithiane and 9.5 ml of triethylamine is added, the temperature rising slightly and the 2,5-dihydroxy-1,4-dithiane going slowly into solution. The reaction mixture is stirred for 20 hours at 50° and then poured into 1.5 liters of water, whereupon it is shaken up with ether. The organic phase is shaken up several times with 2-N hydrochloric acid and then with 2-N caustic soda, washed with water, dried and evaporated. The residue consists of 2-amino-3-(2,6-difluorobenzoyl)thiophene. This product can be employed in the next step without further purification. Recrystallized from ethanol, the substance melts at 130°–133°.

c. 24 G of crude 2-amino-3-(2,6-difluorobenzoyl)-thiophene is dissolved in 120 ml of absolute dioxane, treated with 24 g of anhydrous potassium carbonate and 29 ml of chloroacetyl chloride is added. The mixture is stirred for 3 hours at 50°, then cooled, poured into 1 liter of 4 percent potassium carbonate solution and stirred for 1 hour. The 2-chloroacetylamino-3-(2,6-difluorobenzoyl)thiophene accruing crystalline is filtered off, washed with water and recrystallized from ethanol; melting point 143°–144°.

d. 27 g of 2-chloroacetylamino-3-(2,6-difluorobenzoyl)-thiophene is refluxed for 1 hour in 300 ml of absolute acetone with 14 g of sodium iodide. The mixture is then evaporated in vacuum. The residue is taken up with water and methylene chloride and shaken with some sodium thiosulfate, whereupon the organic phase is separated off, dried and evaporated. The residue consisting of 3-(2,6-difluorobenzoyl)-2-iodoacetylaminothiophene can be employed in the next step without further purification. After recrystallization from ethanol, its melting point is 157°–159°.

e. 26 G of crude 3-(2,6-difluorobenzoyl)-2-iodoacetylaminothiophene is introduced with stirring into 500 ml of liquid ammonia. The resulting mixture is refluxed for 5 hours, then evaporated to dryness in vacuum and the residue is taken up with methylene chloride and water. The organic phase is separated off, shaken with 0.2-N hydrochloric acid and then treated with so much ether that the organic phase comes to lie above the aqueous phase, whereupon the aqueous phase is separated off. The organic phase is further shaken several times with 0.2-N hydrochloric acid. The combined hydrochloric acid aqueous phases are neutralized with sodium bicarbonate and the precipitating 2-aminoacetylamino-3-(2,6-difluorobenzoyl)thiophene is shaken up with methylene chloride. The methylene chloride solution is then dried and evaporated. The product can be employed in the next step without further purification. After recrystallization from methanol, the melting point is 145°–148°.

f. A solution of 3.8 g of 2-aminoacetylamino-3-(2,6-difluorobenzoyl)thiophene in 76 ml of isobutyric acid is boiled at reflux for 8 minutes. The medium is then cooled and poured into sodium bicarbonate solution, whereupon the mixture is shaken up with methylene chloride. The methylene chloride phase is separated off, shaken up with 2-N hydrochloric acid and treated with so much ether that the organic phase comes to lie above the aqueous phase, whereupon the hydrochloric acid aqueous phase is separated off, the organic phase is further shaken up several times with 2-N hydrochloric acid and the combined hydrochloric acid aqueous phases are neutralized with sodium bicarbonate. The precipitating 5-(2,6-difluorophenyl)-1,3-dihydro-2H-thieno[2,3c-][1,4]diazepin-2-one is extracted with a large amount of methylene chloride, whereupon the methylene chloride solution is dried and concentrated. The crystals now precipitating are filtered and washed with methylene chloride; melting point 235°–237°.

EXAMPLE 7

19.5 g of 1,3-dihydro-5-(o-nitrophenyl)-2H-thieno[2,3-e][1,4]diazepin-2-one are dissolved with heating in 220 ml of 100 percent glacial acetic acid. The solution is cooled and then added dropwise over a period of 1 hour to a solution of 16 ml of sulfuryl chloride in 170 ml of 100 percent glacial acetic acid, the temperature being held between 15°C. and 20°C. The mixture is stirred for 1 hour and then evaporated in vacuum, the temperature of the heating-bath not exceeding 35°C. The residue is taken up with 1.3 liters of methylene chloride and 500 ml of 5 percent sodium hydrogen carbonate solution which has been treated with 3 ml of concentrated ammonia. The mixture is shaken and the organic phase is separated off, shaken out with 500 ml of sodium hydrogen carbonate solution containing 3 ml of concentrated ammonia, dried over sodium sulfate, evaporated to 100 ml and left to crystallize in an ice-box. The precipitated crystals are filtered off and digested with a little ice-cold methylene chloride. They are then filtered off and dried to give thin-layer chromatographically (Kieselgel/ether) pure 7-chloro-1,3-dihydro-5-(o-nitrophenyl)-2-H-thieno[2,3-e][1,4]diazepin-2-one of melting point 253°–254°C.

The starting materials can be prepared as follows:

a. 81 g of o-nitroacetophenone are dissolved in 200 ml of absolute chloroform, a spatula tip of anhydrous aluminum chloride is added and a solution of 101 g of bromine in 200 ml of absolute chloroform is added dropwise with stirring at room temperature, decolorization and evolution of hydrogen bromide occurring after a short period of time. After half an hour, the addition is complete. The mixture is warmed to 50°C. for 15 minutes and then evaporated to dryness in a water-jet pump vacuum. The initially oily o-nitrophenacyl bromide is treated in the same vessel with 380 ml of 96 percent ethanol, which causes it to crystallize out. The mixture is warmed to a temperature between 40°C. and 50°C. and solution occurs. A solution of 102 g of potassium cyanide in 365 ml of water is added in such a way that the temperature does not exceed 60°C. After stirring for 1 ½ hours at 50°C. (with occasional formation of a precipitate which goes into solution again), the mixture is diluted with 2 liters of water and 50 g of activated charcoal are stirred in. The solid is filtered off by suction and the procedure is repeated with a further 50 g of activated charcoal. The filtrate, which is now yellow to brown-yellow in color, is acidified to pH 2 with concentrated hydrochloric acid and the precipitating yellow to brown-yellow cyrstalline o-nitrophenacyl cyanide is filtered off by suction and washed twice with water and twice with a little ice-cold ethanol. After drying, the product which is thus obtained is sufficiently pure for further use. The substance melts at 101°–103°C.

b. 198 g of o-nitrophenacyl cyanide are dissolved in 400 ml of absolute dioxane. 79.2 g of 2,5-dihydroxy-1,4-dithiane are suspended in this solution and 70 ml of triethylamine are added dropwise with stirring over a period of 10 minutes, the temperature rising by 20°C. and the 2,5-dihydroxy-1,4-dithiane going slowly into solution. As soon as the temperature begins to fall, the mixture is boiled at reflux for half an hour and then evaporated in a water-jet pump vacuum. The oily residue is dissolved in 2 liters of methylene chloride and the solution is shaken out with two 1 liter portions of 2-N hydrochlovic acid and then with three 1 liter portions of 2-N sodium hydroxide solution. The organic phase is dried with sodium sulfate and evaporated. If the oily residue does not crystallize spontaneously it is treated with ca 20 ml of methylene chloride, scratched with seed-crystals and thus brought to crystallization. The crystalcake is cooled to +30°C. filtered off by suction as much as possible, digested once with a little cold (−30°C.) methylene chloride and again filtered off by suction. The 2-amino-3-(o-nitrobenzoyl)-thiophene which is thus obtained is sufficiently pure for further use. The substance melts at 114°–116°C.

e. 150 g of 2-amino-3-(o-nitrobenzoyl)-thiophene are dissolved in 700 ml of absolute dioxane, the solution is treated with 150 g of calcined potassium carbonate and 181 ml of chloroacetyl chloride are added dropwise with stirring over a period of 30 minutes, the temperature not exceeding 60°C. After the addition is complete, the mixture is stirred for 2 hours and then poured slowly with strong stirring into 4 liters of 10 percent potassium carbonate solution. The mixture is stirred for half an hour and the product, which precipitates in large crystalline fragments, is filtered off by suction, triturated in a mortar with water and washed thoroughly with water. After drying the 2-chloroacetylamino-3-(o-nitrobenzoyl)-thiophene which is obtained melts at 163°–165°. This material can be used in the next step without further purification.

d. 148 g of 2-chloroacetylamino-3-(o-nitrobenzoyl)-thiophene are boiled at reflux for 1 hour with 71 g of sodium iodide in 1.5 liters of acetone. The mixture is then evaporated in vacuum and the residue is treated with 2 liters of methylene chloride and 2 liters of concentrated aqueous ammonia. This mixture is stirred for 48 hours in a closed vessel in such a way that the layers do not intermix. After the reaction is complete, the layers are separated and the aqueous phase is shaken out twice with 200 ml of methylene chloride. The combined organic phases are brought to pH 7 by the addition of concentrated hydrochloric acid with strong stirring, treated with 145 ml of concentrated hydrochloric acid and 300 ml of water, thoroughly intermixed and left to crystallize overnight in an ice-box. The crystals are then filtered off, washed with some methylene chloride and 0.5-N hydrochloric acid, suspended in 1 liter of methylene chloride and shaken with 1 liter of 5 percent sodium hydrogen carbonate solution and 10 ml of concentrated ammonia until they have gone completely into solution. The organic phase is separated off and the aqueous phase is shaken out with 200 ml of methylene chloride. The combined organic phases are dried with sodium sulfate and evaporated to yield pure 2-aminoacetylamino-3(o-nitrobenzoyl)-thiophene of melting point 184°–185°C.

e. 75 g of 2-aminoacetylamino-3-(o-nitrobenzoyl)-thiophene are introduced in one portion with strong stirring into 1.5 liters of boiling isobutyric acid and the mixture is boiled at reflux for 4 minutes. It is then cooled as rapidly as possible and decanted off from the precipitate which is deposited and the solution is evaporated in vacuum. The evaporation residue and the precipitate are dissolved, with optical warming, in 800 ml of methylene chloride. The solution is washed neutral with 500 ml of saturated sodium bicarbonate solution, the organic phase is separated off and the aqueous phase is shaken out with 100 ml of methylene chloride. The combined organic phases are dried with sodium sulfate and then immediately stirred for 10 minutes with 30 g of activated charcoal. The sodium sulfate and the activated charcoal are then filtered off by suction and the filtrate is shaken with 500 ml of 2-N hydrochloric acid. The mixture is left overnight in an ice-box to allow 1,3-dihydro-5-(o-nitrophenyl)-2H-thieno[2,3-e][1,4]diazepin-2-one hydrochloride to crystallize out. This hydrochloride is then filtered off, washed with some methylene chloride and 2-N hydrochloric acid, suspended in 800 ml of methylene chloride and shaken with 800 ml of 5 percent sodium hydrogen carbonate solution and 10 ml of concentrated ammonia until it has gone completely into solution. The organic phase is separated off and the aqueous phase is shaken out with 100 ml of methylene chloride. The combined organic phases are dried with sodium sulfate and evaporated. The residue consists of crude 1,3-dihydro-5-(o-nitrophenyl)-2H-thieno[2,3-e][1,4]diazepin-2-one. Digestion with ice-cold methylene chloride yields the pure product of melting point 255°–257°C.

EXAMPLE 8

9.14 g of 5-(o-chlorophenyl)-1,3-dihydro-2H-thieno-[2,3-e][1,4]diazepin-2-one are stirred at 0° into 45 ml of conc. sulfuric acid. The resultant medium is then cooled to −10° and a mixture of 2.2 ml of nitric acid (16.45-N) and 4.7 ml of conc. sulfuric acid is added dropwise within 25 minutes. After stirring for a further 25 minutes between 0° and −5°, the reaction solution is poured into ice-water and neutralized with solid sodium bicarbonate. The precipitating precipitate is filtered off, washed several times with ethanol, water and again ethanol and recrystallized from dioxane yielding 5-(o-chlorophenyl)-1,3-dihydro-7-nitro-2H-thieno[2,3-e][1,4]-diazepin-2-one in the form of fine yellow needles of melting point 269° (dec.)

EXAMPLE 9

0.725 g (0.0025 mol) of 5-(o-chlorophenyl)-1,3-dihydro-1-methyl-2H-thieno[2,3-e][1,4]diazepin-2-one is dissolved at 0° in 5 ml of concentrated sulfuric acid. The resultant medium is cooled to −10° and a mixture of 0.167 ml of concentrated nitric acid (D = 1.42) and 0.265 ml of concentrated sulfuric acid is added slowly at this temperature. The mixture is stirred for a further 25 minutes at −5° to 0° and then poured into 70 ml of sodium bicarbonate solution. The precipitating product is filtered off by suction and washed neutral. There is obtained 5-(o-chlorophenyl)-1,3-dihydro-1-methyl-7-nitro-2H-thieno[2,3-e][1,4]diazepin-2-one in the form of a practically pure yellow product. By recrystallization from ethanol and benzene with activated charcoal there is obtained a pure product of melting point 162°–165°.

EXAMPLE 10

1.5 g of 7-chloro-5-(o-fluorophenyl)-1,3-dihydro-2H-thieno[2,3-e][1,4]diazepin-2-one is dissolved with shaking in the cold in 5.5 ml of 1N methanolic sodium methylate solution. The methanol is distilled off in vacuum at room temperature. The residue is taken up in 5.5 ml of dimethylformamide 0.38 ml of methyl iodide is thereupon added. The resultant medium is shaken until solution is complete, left to stand for 1 hour, the dimethylformamide distilled off in vacuum and the residue taken up in methylene chloride and 2-N caustic soda. The organic phase is washed with 2-N caustic soda and then with water, dried and evaporated. The residue is boiled in cyclohexane with activated charcoal, filtered and evaporated, there being obtained 7-chloro-5-(o-fluorophenyl)-1,3-dihydro-1-methyl-2H-thieno[2,3-e][1,4]diazepin-2-one of melting point 97°–98°.

EXAMPLE 11

A solution of 1.1 g of 5-(o-fluorophenyl)-1,3-dihydro-1-methyl-2H-thieno[2,3-e][1,4]diazepin-2-one in 10 ml of glacial acetic acid is added dropwise at room temperature and with stirring to a solution of 4 ml of sulfuryl chloride in 10 ml of glacial acetic acid. The resultant medium is further stirred for half an hour and the glacial acetic acid is thereafter distilled off in vacuum at 25°. The residue is neutralized with saturated sodium bicarbonate solution, whereupon the precipitate is filtered off, washed and dried. For purification, the product is dissolved in cyclohexane, boiled with activated charcoal, filtered and evaporated. There is obtained 7-chloro-5-(o-fluorophenyl)-1,3-dihydro-1-methyl-2H-thieno[2,3-e][1,4]diazepin-2-one which is recrystallized from cyclohexane for further purification and then melts at 97°–98°.

The starting product can be manufactured as follows:
5.2 g of 5-(o-fluorophenyl)-1,3-dihydro-2H-thieno-[2,3-e][1,4]diazepin-2-one is dissolved in 21 ml of 1-N methanolic sodium methylate solution. The methanol is distilled off at room temperature and the residue is dried in vacuum. The product is thereupon dissolved in 21 ml of dimethylformamide. 1.5 ml of methyl iodide is added and the resultant medium is left to stand for 1 hour. The dimethylformamide is distilled off in vacuum, whereupon the residue is taken up in methylene chloride and 2-N caustic soda. The organic phase is separated off, washed with 2N caustic soda and water, dilute with a five-fold amount of benzene and shaken up with 2-N hydrochloric acid. The hydrochloric acid phase is separated off and neutralized with sodium bicarbonate, whereupon the precipitate which forms is shaken up with benzene. The benzene solution is filtered through a column with Kieselgel and then evaporated. For purification, the 5-(o-fluorophenyl)-1,3-dihydro-2H-thieno-[2,3-e][1,4]diazepin-2-one obtained is recrystallized from cyclohexane, and melts at 113°–116°.

EXAMPLE 12

2.4 g of 5-(o-fluorophenyl)-1,3-dihydro-2-H-thieno-[2,3-e][1,4]diazepin-2-one is dissolved in 18 ml of conc. sulfuric acid at a temperature of −5° to 0°C., whereupon a mixture of 0.63 ml of 16.45-N nitric acid and 1 ml of conc. sulfuric acid is added dropwise at −10° with stirring. The mixture is further stirred for a further 30 minutes at a temperature of −5° to 0° and then poured onto 200 ml of ice-water. The separated sulfate is decomposed with sodium hydrogen carbonate solution, whereupon the precipitate is filtered off and recrystallized from ethanol. There is obtained 5-(o-fluorophenyl)-1,3-dihydro-7-nitro-2H-thieno-[2,3-e][1,4]diazepin-2-one of melting point 258°–259°.

EXAMPLE 13

1.1 g of 5-(o-fluorophenyl)-1,3-dihydro-1-methyl-2H-thieno[2,3-e][1,4]diazepin-2-one is dissolved in 8 ml of conc. sulfuric acid at a temperature of −5° to 0° and then treated dropwise with stirring at −10° with a mixture of 0.27 ml of 16.45-N nitric acid and 0.5 ml of conc. sulfuric acid. The mixture is further stirred for a further 30 minutes at a temperature of −5° to 0° and then poured onto 100 ml of ice-water. The separated sulfate decomposed with sodium hydrogen carbonate solution and the precipitate filtered off. There is obtained 5-(o-fluorophenyl)-1,3-dihydro-1-methyl-7-nitro-2H-thieno[2,3-e][1,4]diazepin-2-one which is recrystallized from benzene and melts at 175°–177°.

EXAMPLE 14

1.64 g of 5-(o-fluorophenyl)-1,3-dihydro-7-nitro-2H-thieno[2,3-e][1,4]diazepin-2-one is dissolved with shaking in the cold in 6 ml of 1-N methanolic sodium methylate solution. The methanol is then distilled off in vacuum at room temperature and the residue is taken up in 10 ml of dimethylformamide. 0.4 ml of methyl iodide is thereupon added. The resulting mixture is shaken until solution is complete, left to stand for 1 hour, the dimethylformamide distilled off in vacuum and the residue taken up in methylene chloride and 2-N caustic soda. The organic phase is separated off, washed with 2-N caustic soda and then with water. It is then dried and evaporated. The residue is recrystallized from benzene with activated charcoal giving 5-(o-fluorophenyl)-1,3-dihydro-1-methyl-7-nitro-2H-thieno[2,3-e][1,4]diazepin-2-one of melting point 175°–177°.

EXAMPLE 15

A solution of 9.7 g of 1,3-dihydro-1-methyl-5-(o-fluoromethylphenyl)-2H-thieno[2,3-e][1,4]diazepin-2-one in 100 ml of glacial acetic acid is added dropwise with stirring at room temperature to a solution of 8 ml of sulfuryl chloride in 100 ml of glacial acetic acid. The mixture is stirred for 4 hours and then the glacial acetic acid is distilled off in vacuum at 25°C. The residue is taken up in methylene chloride and neutralized with sodium bicarbonate solution. The organic phase is washed with water, dried and evaporated. The residue is recrystallized from cyclohexane with activated charcoal to yield 7-chloro-1,3-dihydro-1-methyl-5-(o-trifluoromethylphenyl-2H-thieno[2,3-e][1,4]diazepin-2-one of melting point 100°–102°C.

The starting material can be prepared as follows:

15.5 g of 1,3-dihydro-5-(o-trifluoromethylphenyl)-2H-thieno[2,3-e][1,4]diazepin-2-one are dissolved with shaking in the cold in 55 ml of 1-N methanolic sodium methylate solution. The methanol is distilled off in vacuum and the residue is taken up in 55 ml of dimethylformamide. 3.8 ml of methyl iodide are then added and the mixture is shaken until solution is complete. After 1 hour, the dimethylformamide is distilled off in vacuum and the residue is taken up in methylene chloride and water. The organic phase is shaken out with water, dried and evaporated. The crude product is employed in the next step without further purification. After recrystallization for methanol, the colorless crystals of 1,3-dihydro-1-methyl-5-(o-trifluoromethylphenyl)-2H-thieno[2,3-e][1,4]diazepin-2-one melt at 110°–113°C.

EXAMPLE 16

0.322 g of 7-chloro-1,3-dihydro-5-(o-nitrophenyl)-2H-thieno[2,3-e][1,4]diazepin-2-one is dissolved in 0.9 ml of 1.22-N methanolic sodium methylate solution. The resulting medium is evaporated to dryness in vacuum and the residue is taken up with 1.8 ml of abs. dimethylformamide. It is thereupon treated with 0.084 ml of methyl iodide, slight warming occurring and a clear solution results. After standing for 2 hours, the reaction mixture is concentrated in vacuum, treated with water and shaken up several times with methylene chloride. The organic phase is shaken up several times with 1,5-N caustic soda, washed neutral with water, dried and evaporated. The residue is brought to crystallization and 7-chloro-1,3-dihydro-1-methyl-5-(o-nitrophenyl) 2H-thieno-[2,3-e][1,4]diazepin-2-one is obtained. The product after recrystallization from methanol melts at 145°–147°C.

EXAMPLE 17

0.96 g of 7-chloro-1,3-dihydro-5-(o-nitrophenyl)-2-H-thieno[2,3-e][1,4]diazepin-2-one are dissolved in 3 ml of 1-N methanolic sodium methylate solution. The solution is evaporated to dryness in vacuum and the residue is sharply sucked dry and then taken up in 4 ml of dimethylformamide. 0.36 ml of allylbromide are added and the flask is closed and warmed gently for 5 minutes on a water-bath. The dimethylformamide is then evaporated off in vacuum and the residual oil is shaken out with ether and 2-N hydrochloric acid. The combined aqueous hydrochloric acid phases are washed with ether and neutralized with potassium carbonate. The precipitating oil is shaken out several times with 2-N sodium hydroxide solution and dried. For the removal of a yellow coloring, it is then passed over a column (diameter 2 cm, length 10 cm) of Kieselgel (diameter 0.2 – 0.5 mm). The eluate is evaporated and brought to crystallization with methanol to yield 1-allyl-7-chloro-1,3-dihydro-5 -(o-nitrophenyl)-2-H-thieno[2,3-e][1,4]diazepin-2-one, which is recrystallized from methanol and cyclohexane and then melts at 93°–95°C.

EXAMPLE 18

0.3 g of 2-aminoacetylamino-5-chloro-3-(2,6-difluorobenzoyl)thiophene is boiled at reflux for 8 minutes in 1 ml of pivalic acid. The reaction mixture is then neutralized with sodium bicarbonate solution and extracted with methylene chloride. The organic phase is treated with 2-N hydrochloric acid and then with such an amount of ether that it comes to lie above the aqueous phase and shaken up several times with 2-N hydrochloric acid. The combined aqueous hydrochloric acid phases are washed with ether and neutralized with sodium bicarbonate, whereupon the precipitating product is extracted with methylene chloride and the organic phase is evaporated. The 7-chloro-5-(2,6-difluorophenyl)-1,3-dihydro-2H-thieno-[2,3-e][1,4]diazepin-2-one obtained after recrystallization from ethanol melts at 245–247°.

The starting product can be manufactured as follows:

a. 3 g of 2-chloroacetylamino-3-(2,6-difluorobenzoyl)-thiophene is dissolved in 20 ml of abs. chloroform and treated with stirring with 2.2 ml of sulfuryl chloride in 10 ml of chloroform. After 1 hour, the mixture is washed neutral with sodium hydrogen carbonate solution. The organic phase is then dried and evaporated. The crystalline residue is recrystallized from ethanol yielding 5-chloro-2-chloroacetylamino -3-(2,6-difluorobenzoyl)-thiophene of m.p. 160°–163°.

b. 1.5 g of 5-chloro-2-chloroacetylamino-3-(2,6-difluorobenzoyl)thiophene is dissolved in 20 ml of acetone, treated with 0.75 g of sodium iodide and boiled for 1 hour at reflux. The resulting mixture is then evaporated in vacuum. The residue is taken up with methylene chloride-water and some sodium thiosulfate is added, whereupon the organic phase is separated off, dried and evaporated. 5-Chloro-3-(2,6-difluorobenzoyl)-2-iodoacetylaminothiophene is obtained. The product after recrystallization from ethanol melts at 143°–145°.

c. 1.4 g of 5-chloro-3-(2,6-difluorobenzoyl)-2- iodoacetylaminothiophene is dissolved in 10 ml of methylene chloride. The solution is treated with 60 ml of conc. ammonia and stirred for 50 hours at room temperature in such a way that the layers do not intermix. The mixture is then separated in the separating funnel, whereupon the organic phase is washed with water, treated with 2-N hydrochloric acid and such an amount of ether that it comes to lie above the aqueous phase and then extracted several times with 2-N hydrochloric acid. The combined aqueous hydrochloric acid phases are washed with ether and neutralized with sodium bicarbonate. The precipitating product is extracted with methylene chloride, whereupon the methylene chloride phase is dried and evaporated. 2-Aminoacetylamino-5-chloro-3-(2,6-difluorobenzoyl)thiophene is obtained. The product after recrystallization from ether melts at 149°–151°.

EXAMPLE 19

11.12 g of 5-(o-chlorophenyl)-1,3-dihydro-7-iodo-2H-thieno [2,3-e][1,4]diazepin-2-one is dissolved in 28.4 ml of 1-N methanolic sodium methylate solution. The resultant medium is evaporated to dryness in vacuum. The residue is taken up with 50 ml of abs. dimethylformamide and then treated with 1.8 ml of methyl iodide. The solution warms somewhat and is allowed to stand for an additional 1 hour. It is then evaporated in vacuum, the residue is taken up with methylene chloride and 2-N caustic soda. The organic layer is shaken up several times with 2-N caustic soda and then 2-N hydrochloric acid is added. The resultant medium is then treated with such an amount of ether that the organic phase comes to lie above the aqueous phase. The organic phase is shaken up several times with 2-N hydrochloric acid and the combined hydrochloric acid aqueous phases are neutralized with sodium bicarbonate. The precipitating product is extracted with ether, whereupon the ether extract is dried and evaporated. The oil which crystallizes immediately is recrystallized from ether yielding 5-(o-chlorophenyl)-1,3-dihydro-7-iodo-1-methyl-2H-thieno[2,3-e][1,4]diazepin-2-one of m.p. 117°–118°.

EXAMPLE 20

1.0 g of 5-(2,6-difluorophenyl)-1,3-dihydro-2H-thieno[2,3-e][1,4]diazepin-2-one is dissolved at 0° in 7 ml of conc. sulfuric acid. The resultant solution is cooled to −10° and a mixture of 0.24 ml of nitric acid (D = 1.42) and 0.40 ml of conc. sulfuric acid is added dropwise with stirring while maintaining the temperature at −10°. After stirring for a further 15 minutes, the solution is poured into ice-water, neutralized with sodium bicarbonate and the precipiating crystals filtered off by suction. The 5-(2,6-difluorophenyl)-1,3-dihydro-7-nitro-2H-thieno[2,3-e] [1,4]diazepin-2-one obtained can be recrystallized from dioxane and then melts at 268°–269°.

EXAMPLE 21

7.7 g of 1,3-dihydro-1-methyl-5-(o-nitrophenyl-2H-thieno [2,3-e][1,4]diazepin-2-one are dissolved in 180 ml of absolute chloroform and a solution of 10 g of sulfuryl chloride in 20 ml of absolute chloroform is added dropwise with stirring at 20°C. over a period of 20 minutes. After 2/3 of the sulfuryl chloride has been added, 7-chloro-1,3-dihydro-1-methyl-5-(o-nitrophenyl)-2H-thieno[2,3-E][1,4]-diazepin-2-one hydrochloride begins to precipitate out. After the addition is complete, the mixture is stirred for 2 hours at room temperature and then shaken neutral with sodium bicarbonate solution, which causes everything to go into solution. The organic phase is separated off, dried and evaporated in vacuum. For the removal of a coloring which is adhering to the product, the evaporation residue is dissolved in 800 ml of methylene chloride and passed over a column (diameter 2 cm, length 10 cm) of Kieselgel. The column is washed with a further 200 ml of methylene chloride and the solution is evaporated in vacuum to yield 7-chloro-1,3-dihydro-1-methyl-5-(o-nitrophenyl)-2H-thieno[2,3-e][1,4]-diazepin-2-one, which can be recrystallized from ether and then melts at 145°–147°C.

The starting material can be prepared as follows:

a. 10 g of 2-amino-3-(o-nitrobenzoyl)-thiophene are dissolved in 50 ml of absolute dioxane and treated with 6 g of calcined potassium carbonate. 20 ml of acetyl chloride are allowed to flow, with stirring, into this mixture. After stirring for 2 hours, the mixture is poured into 750 ml of 10 percent potassium carbonate solution and the precipitating product is shaken out with methylene chloride. The solution is dried and evaporated to yield a crystalline residue of 2-acetylamino-3-(o-nitrobenzoyl)-thiophene, which can be recrystallized from benzene and then melts at 152°–153°C.

b. 11.4 g of 2-acetylamino-3-(o-nitrobenzoyl)-thiophene are dissolved in 50 ml of absolute dioxane and 5 ml of a 20 percent sodium hydride suspension in mineral oil are added with stirring. After the evoluation of hydrogen is complete, 5 ml of dimethyl sulfate are added and the mixture is boiled at reflux for 5 minutes. It is then poured into water and extracted several times with methylene chloride. The organic phase is dried, stirred with activated charcoal, filtered and evaporated in vacuum. The oily residue is washed several times with petroleum ether and brought to crystallization with ether. After washing with ether and benzene, the 2-(N-acetyl-N-methylamino)-3-(o-nitrobenzoyl)-thiophene which is obtained can be recrystallized from benzene and then melts at 134°–135°C.

c. 2 g of 2-(N-acetyl-N-methylamino)-3-(o-nitrobenzoyl)-thiophene are heated for 10 minutes on a boiling water-bath with 10 ml of concentrated sulfuric acid. The mixture is then poured onto 250 g of ice and extracted several times with methylene chloride. The organic phase is dried, stirred with activated charcoal, filtered and evaporated in vacuum. The oily residue of 2-methylamino-3-(o-nitrobenzoyl)-thiophene can be brought to crystallization with ether. After recrystallization from benzene the substance melts at 123°–124°C.

d. 0.80 g of 2-methylamino-3-(o-nitrobenzoyl)-thiophene are dissolved in 20 ml of absolute dioxane, 1.0 g of calcined potassium carbonate is added and the mixture is treated with stirring with 1.2 g of carbobenzoxyglycine chloride. After stirring to 18 hours at room temperature, the mixture is poured into 100 ml of 5 percent sodium hydrogen carbonate solution and extracted several times with methylene chloride. The combined organic phases are dried and evaporated. The oily residue is stirred for 30 minutes at room temperature in 5 ml of 30 percent hydrobromic acid in glacial acetic acid, then poured into 300 ml of 5 percent sodium hydrogen carbonate solution and extracted several times with methylene chloride. The combined methylene chloride phases are shaken with 1.5-N hydrochloric acid and then with such an amount of ether that the organic phase comes to lie above the aqueous phase. The phases are separated and the organic phase is shaken out several times with dilute hydrochloric acid. The combined hydrochloric acid phases are shaken out with ether and neutralized with sodium hydrogen carbonate. The precipitating product is extracted several times with methylene chloride and the organic phase is dried and evaporated. The oily residue is boiled at reflux for 10 minutes in 2 ml of absolute ethanol and the resulting solution is evaporated in vacuum. The residue is taken up with ether and 0.5-N hydrochloric acid and the organic phase is extracted several times with 0.5-N hydrochloric acid. The combined hydrochloric acid phases are stirred with activated charcoal, filtered and neutralized with sodium hydrogen carbonate. The precipitating product is extracted with ether and the ether solution is dried, stirred with activated charcoal, filtered and evaporated. The crystalline residue consists of 1,3-dihydro-1-methyl-5-(o-nitrophenyl)-2H-thieno[2,3-e][1,4] diazepin-2-one, which can be recrystallized from ether and then melts at 151°C.

EXAMPLE 22

A solution of 8 g of 1,3-dihydro-5-(o-trifluoromethylphenyl) -2H-thieno[2,3-e][1,4]diazepin-2-one in 100 ml of glacial acetic acid is added dropwise with stirring at room temperature to a solution of 4.2 ml of sulfuryl chloride in 100 ml of glacial acetic acid. The mixture is stirred for 4 hours and then the glacial acetic acid is distilled off in vacuum at 25°C. The residue is taken up in 150 ml of methylene chloride and neutralized with sodium bicarbonate solution. The insoluble product is filtered off, washed with methylene chloride and recrystallized from ethanol to yield 7-chloro-1,3-dihydro-5-(o-trifluoromethylphenyl)-2H -thieno[2,3-e][1,4]diazepin-2-one of melting point 278°-281°C.

The starting material can be prepared as follows:

a. 50 g of sodium are finely partitioned in 750 ml of boiling absolute xylene using a Hershberg stirrer. After cooling, the xylene is replaced by 1250 ml of absolute benzene and the mixture is heated to boiling. A mixture of 171 g of o-trifluoromethylbenzonitrile, 90 g of acetonitrile and 500 ml of absolute benzene is rapidly added dropwise in such a way that the solution continues to boil without further heating. It is then boiled for 4 hours at reflux and stirred overnight at room temperature. The black precipitate is filtered off, washed with absolute benzene and stirred into 1250 ml of ether. Water is added slowly to this mixture until the precipitate dissolves and an aqueous phase forms. The ethereal phase is separated off, dried and evaporated. The residue is distilled at 0.01 mm Hg and 130°C. and the distillate is recrystallized from ethanol to yield o-trifluoromethylbenzoacetodinitrile of melting point 71°-73°C.

b. 70 g of o-trifluoromethylbenzoacetodinitrile are dissolved with shaking and cooling in 350 ml of concentrated hydrochloric acid. After half an hour, a white precipitate forms. This is then filtered off and washed with water. A further amount of product is obtained by diluting the hydrochloric acid filtrate. The combined precipitates are dried and the product is sufficiently pure for further use. After recrystallization from ethanol, the colorless crystals of o-trifluoromethylphenacyl cyanide melt at 71°-73°C.

c. 61.5 g of o-trifluoromethylphenacyl cyanide are boiled at reflux for 30 minutes in 120 ml of dioxane with 20.4 g of 2,5-dihydroxy-1,4-dithiane and 6 ml of triethylamine. The dioxane is distilled off in vacuum and the residue is digested with the minimum amount of methylene chloride. The very pure residue consists of 2-amino-3-(o-trifluoromethylbenzoyl)-thiophene, which can be recrystallized from benzene and then melts at 129°-131°C.

d. 61 g of 2-amino-3-(o-trifluoromethylbenzoyl)-thiophene are dissolved in 350 ml of absolute dioxane. 68 g of anhydrous potassium carbonate are stirred in and 68 ml of chloroacetyl chloride are added in one portion. The mixture is stirred for 2 hours at room temperature and then poured into a solution of 126 g of potassium carbonate in 3.5 liters of water. The precipitate which forms is filtered off and dissolved in methylene chloride. The solution is dried with sodium sulfate and the solvent is distilled off. The crude 2-chloroacetylamino-3- (o-trifluoromethylbenzoyl)-thiophene is sufficiently pure for further use. After recrystallization from ethanol, the substance melts at 130°-132°C.

e. 77.5 g of 2-chloroacetylamino-3-(o-trifluoromethylbenzoyl)-thiophene are boiled at reflux for 1 hour in 800 ml of acetone with 40 g of sodium iodide. The solvent is evaporated in vacuum and the residue is partitioned between methylene chloride and water containing some sodium thiosulfate. The organic phase is separated off and evaporated. The crude 2-iodoacetylamino-3-(o-trifluoromethylbenzoyl)-thiophene which is obtained can be employed in the next step without further purification. After recrystallization from methanol, the substance melts at 102°-105°C.

f. 95 g of 2-iodoacetylamino-3-(o-trifluoromethylbenzoyl)-thiophene are dissolved in 950 ml of methylene chloride. The solution is overlaid with 2 ½ liters of concentrated aqueous ammonia and stirred slowly for 2 days in such a way that the two layers do not intermix. The organic phase is then washed neutral and the resulting 2-aminoacetylamino-3-(o-trifluoromethylbenzoyl)-thiophene is extracted with 0.2-N hydrochloric acid, which causes the partial separation of an oily hydrochloride. The oily hydrochloride and the hydrochloric acid solution are neutralized with sodium hydrogen carbonate and the 2-aminoacetylamino-3-(o-trifluoromethylbenzoyl)-thiophene which is set free is extract with methylene chloride. After recrystallization from methylene chloride, the colorless crystals melt at 178°-181°C.

g. 61 g of 2-aminoacetylamino-3-(o-trifluoromethylbenzoyl)-thiophene are introduced into 600 ml of boiling pivalic acid and the mixture is boiled at reflux for 30 minutes. The pivalic acid is then distilled off in vacuum and the residue is taken up in methylene chloride and neutralized by shaking with a sodium bicarbonate solution. The sodium salt of the pivalic acid is filtered off and the organic phase is washed with water, dried and evaporated. The residue consists of 1,3-dihydro-5-(o-trifluoromethylphenyl)-2H-thieno[2,3-e][1,4]diazepin-2-one, which is sufficiently pure for further use. For purification, it is recrystallized from ethanol and then melts at 205°-207°C.

EXAMPLE 23

1.0 g of 7-chloro-1,3-dihydro-5-(o-nitrophenyl)-2H-thieno [2,3-e][1,4]diazepin-2-one is dissolved in the cold in 3.2 ml of 1-N methanolic sodium methylate solution. The methanol is distilled off in vacuum and the residue is dissolved in 10 ml of dimethylformamide. 0.43 g of cyclopropylmethyl bromide are added and the mixture is heated for 30 minutes on a boiling water-bath. The dimethylformamide is then distilled off in vacuum; the residue is taken up in ether and the resulting solution is shaken out with 1-N sodium hydroxide solution. The ether is distilled off, the residue is dissolved in 1-N hydrochloric acid and the resulting solution is washed with benzene and filtered. The hydrochloric acid phase is neutralized with sodium bicarbonate and the oily product is taken up in methylene chloride. The solvent is distilled off and the residual oil is chromatographed on a chromatography column (diameter 2 cm, length 30 cm) of Kieselgel (diameter 0.2 - 0.5 mm) using an eluant mixture of benzene and ether (1:1). Evaporation of the eluate yields a light-yellow oil which can be brought to crystallization by scratching with methanol. After recrystallization from methanol, the 7-chloro-1-cyclopropylmethyl-1,3-dihydro-5-(o-nitrophenyl)-2H-thieno[2,3-e][1,4]diazepin-2-one which is obtained melts at 91°–93°C.

EXAMPLE 24

0.97 g of 7-chloro-1,3-dihydro-5-(o-nitrophenyl)-2H-thieno[2,3-e][1,4]diazepin-2-one are dissolved in the cold in 3.15 ml of 1-N methanolic sodium methylate solution. The methanol is distilled off in vacuum, the residue is taken up in 6 ml of dimethylformamide and treated with 0.41 g of 2-bromoethanol and the resulting mixture is heated for 1 hour on a boiling water-bath. The dimethylformamide is then distilled off in vacuum and the residue is taken up in methylene chloride. The solution is shaken out with 1-N sodium hydroxide solution. The methylene chloride is distilled off, the residue is dissolved in 1-N hydrochloric acid and the solution is washed with benzene and filtered. The hydrochloric acid phase is neutralized with sodium bicarbonate and the oily product is taken up in methylene chloride. The solvent is distilled off and the residual oil can be brought to crystallization by scratching with methanol. After recrystallization from ether, the 7-chloro-1,3-dihydro-1-(2-hydroxyethyl)-5-(o-nitrophenyl)-2H-thieno[2,3-e][1,4]diazepin-2-one which is obtained melts at 143°–145°C.

EXAMPLE 25

1.01 g of 7-chloro-1,3-dihydro-5-(o-nitrophenyl)-2H-thieno[2,3-e][1,4]diazepin-2-one are treated with 3.15 ml of 1-N sodium methylate solution. The solution is evaporated to dryness in vacuum and the residue is sharply sucked dry and then taken up in 5 ml of dimethylformamide. 0.33 g of 85 percent chlorodimethyl ether are added and the mixture is left to stand for 2 hours at room temperature. The solvent is removed; the residual oil is taken up in methylene chloride and the solution is shaken out with 1-N sodium hydroxide solution. The organic phase is dried over sodium sulfate and evaporated to dryness. The product is brought to crystallization by the addition of a little methylene chloride. After recrystallization from ethanol, the 7-chloro-1,3-dihydro-1-methoxymethyl-5-(o-nitrophenyl)-2H-thieno[2,3-e][1,4]diazepin-2-one which is obtained melts at 147°–149°C.

EXAMPLE 26

0.96 g of 7-chloro-1,3-dihydro-5-(o-nitrophenyl)-2H-thieno [2,3-e][1,4]diazepin-2-one are dissolved in 3 ml of 1-N methanolic sodium methylate solution. The solution is evaporated to dryness in vacuum and the residue is sharply sucked dry and then taken up is 4 ml of dimethylformamide. 0.5 g of freshly distilled 2-diethylaminoethyl chloride are added and the flask is closed and heated for 15 minutes on a water-bath. The dimethylformamide is then evaporated off in vacuum and the residual oil is taken up with ether and 2-N hydrochloric acid. The organic phase is shaken out several times with 2-N hydrochloric acid and the combined aqueous hydrochloric acid phases are washed with ether and neutralized with potassium carbonate. The precipitating oil is extracted several times with ether and the combined ether solutions are shaken out several times with 2-N sodium hydroxide solution, dried and evaporated. The residue is brought to crystallization with methanol. After recrystallization from methanol, the 7-chloro-1-(2-diethylaminoethyl)-1,3-dihydro-5 -(o-nitrophenyl)-2H-thieno[2,3-e][1,4]diazepin-2-one which is obtained melts at 110°–112°C.

EXAMPLE 27

1 g of 7-chloro-1,3-dihydro-5-(o-nitrophenyl)-2H-thieno[2,3-][1,4]diazepin-2-one is treated with 3.11 ml of 1-N methanolic sodium methylate solution. The methanol is distilled off in vacuum and the residue is taken up in 8 ml of dimethylformamide. The solution is treated with 0.339 g of ethyl bromide and heated to 80°C. for 30 minutes on a water-bath. The dimethylformamide is then evaporated off in vacuum and the residue is dissolved in ether. The ethereal phase is shaken out several times with 0.5-N sodium hydroxide solution and then carefully extracted with 1-N hydrochloric acid. The aqueous hydrochloric acid phases are neutralized with sodium bicarbonate and shaken out several times with ether. The ethereal solution is dried over sodium sulfate and evaporated. The residue consists of 7-chloro -1,3-dihydro-1-ethyl-5-(o-nitrophenyl)-2H-thieno[2,3-e][1,4] diazepin-2-one of melting point 167°–168°C., which can be recrystallized from methanol.

EXAMPLE 28

1.01 g of 7-chloro-1,3-dihydro-5-(o-nitrophenyl)-2H-thieno[2,3-e][1,4]diazepin-2-one are treated with 3.15 ml of 1-N sodium methylate solution and the solution is evaporated to dryness in vacuum. The residue, which has been sharply filtered off by suction, is taken up in 5 ml of dimethylformamide. The solution is treated with 0.54 g of isopropyl iodide, left to stand for 2 hours at room temperature and then heated for half an hour on a water-bath. The solvent is removed and the residual oil is taken up in ether. The solution is shaken out several times with 2-N hydrochloric acid. The combined hydrochloric acid phases are washed with ether, neutralized with bicarbonate and extracted several times with ether. The combined ether solutions are shaken out several times with 0.5-N sodium hydroxide solution, dried over sodium sulfate and evaporated to dryness. The product can be brought to crystallization by the addition of a little methanol. After recrystallization from methanol, the 7-chloro-1,3-dihydro-1-isopropyl-5-(o-nitrophenyl)-2H-thieno[2,3-e][1,4]diazepin-2-one which is obtained melts at 126°–128°C.

EXAMPLE 29

1.0 g of 5-(2,6-difluorophenyl)-1,3-dihydro-1-methyl-2H-thieno[2,3-][1,4]diazepin-2-one is dissolved at 0°C. in 7 ml of concentrated sulfuric acid. The solution is cooled to −10°C. and treated dropwise with stirring with a mixture of 0.23 ml of nitricacid (D = 1.42) and 0.37 ml of concentrated sulfuric acid, the temperature being held at −10°C. After stirring for a further 15 minutes, the solution is poured into ice-water and neutralized with sodium bicarbonate and the precipitating light-colored crystals are filtered off to yield 5-(2,6-difluorophenyl)-1,3-dihydro-1-methyl-7- nitro-2H-thieno-[2,3-e][1,4]diazepin-2-one which can be recrystallized from dioxane and then melts at 224°–225°C.

The starting material can be prepared as follows:

4 g of 5-(2,6-difluorophenyl)-1,3-dihydro-2H-thieno[2,3-e][1,4]diazepin-2-one are dissolved in 15.3 ml of 1-N methanolic sodium methylate solution. The solution is evaporated to dryness in vacuum, the residue is taken up with 25 ml of absolute dimethylformamide and 2.6 g of methylene iodide are added. The solution warms and is left to stand for 2 hours and then evaporated in vacuum. The residue is taken up with methylene chloride and 2-N sodium hydroxide solution. The organic phase is separated off and shaken out several times with 2-N sodium hydroxide solution. The methylene chloride phase is then treated with 2-N hydrochloric acid and then with such an amount of ether that it comes to lie above the aqueous phase. It is then extracted several times with 2-N hydrochloric acid. The combined hydrochloric acid aqueous phases are washed with ether and neutralized with sodium bicarbonate. The precipitated oil is extracted with ether and the ether extract is dried, filtered over Kieselgel and evaporated. The 5-(2,6-difluorophenyl)-1,3-dihydro-1-methyl-2H-thieno[2,3-e][1,4]diazepin-2-one which is obtained can be recrystallized from ether and then melts at 99°–100° C.

EXAMPLE 30

0.9 g of 5-(2,6-difluorophenyl)-1,3-dihydro-1-methyl-2H-thieno[2,3-e][1,4]diazepin-2-one are dissolved in 25 ml of absolute chloroform and a solution of 0.8 ml of sulfuryl chloride dissolved in 10 ml of chloroform is added dropwise with stirring over a period of 10 minutes. The solution is shaken out with sodium hydrogen carbonate solution, dried and evaporated. The crystalline residue is recrystallized from ether to yield 7-chloro-5-(2,6-difluorophenyl)-1,3-dihydro-1-methyl-2H-thieno [2,3-e][1,4]diazepin-2-one of melting point 95°–96°C.

The following examples illustrate typical pharmaceutical preparations containing the theinodiazepine derivatives provided by the invention:

EXAMPLE A

Suppositories of the following composition can be prepared:

|  | Per Suppository |
|---|---|
| 7-chloro-5-(o-chlorophenyl)-1,3-dihydro -2H-thieno[2,3-e][1,4]diazepin-2-one | 0.010 g |
| cocoa butter (melting point 36°–37°C.) | 1.245 g |
| carnauba wax | 0.045 g |
| for a suppository of | 1.3 g |

The cocoa butter and the carnauba wax are melted in a glass or steel vessel, then mixed thoroughly and cooled to 45°C. Finely powdered 7-chloro-5-(o-chlorophenyl)-1,3-dihydro-2H-thieno [2,3-e][1,4]diazepin-2-one is then added and the mixture is stirred until the solid is completely dispersed. The mixture is poured into suppository molds of a suitable size and allowed to cool. The suppositories are then taken out of the molds and packed individually in waxed paper or metal foil.

EXAMPLE B

Capsules of the following composition can be prepared:

|  | Per Capsule |
|---|---|
| 7-chloro-5-(o-chlorophenyl)-1,3-dihydro-2H-thieno[2,3-e][1,4]diazepin-2-one | 10 mg |
| lactose | 165 mg |
| maize starch | 30 mg |
| talc | 5 mg |
| total capsule content | 210 mg |

The 7-chloro-5-(o-chlorophenyl)-1,3-dihydro-2H-thieno-[2,3-e][1,4]diazepin-2-one, the lactose and the maize starch are mixed firstly in a mixer and then in a comminuting machine. The mixture is returned to the mixer and the talc is added and mixed thoroughly. The mixture is filled mechanically into hard gelatin capsules.

EXAMPLE C

An injection solution of the following composition can be prepared:

|  | Per Ml |  |
|---|---|---|
| 7-chloro-5-(o-chlorophenyl)-1,3-dihydro-2H-thieno[2,3-e][1,4]diazepin-2-one | 5.0 | mg |
| propylene glycol | 0.4 | ml |
| benzyl alcohol (benzaldehyde-free) | 0.015 | ml |
| ethanol (95%) | 0.10 | ml |
| sodium benzoate | 48.8 | mg |
| benzoic acid | 1.2 | mg |
| water for injection q.s ad | 1.0 | ml |

For the manufacture of 10,000 ml of an injection solution, 50 g of 7-chloro-5-(o-chlorophenyl)-1,3-dihydro-2H-thieno[2,3-e][1,4]diazepin-2-one are dissolved in 150 ml of benzyl alchol and 4000 ml of propylene glycol and 1000 ml of ethanol are added. 12 g of benzoic acid are then dissolved in this mixture and a solution of 488 g of sodium benzoate in 300 ml of water for injection is added. The solution which is obtained is brought to a volume of 10,000 ml by the addition of water for injection, filtered and filled into ampoules of a suitable size; the remaining volume of the ampoules is filled with nitrogen, the ampoules are closed by fusion and then sterilized for 30 minutes in an autoclave at 0.7 atmosphere.

EXAMPLE D

Suppositories, capsules and an injection solution which contain 7-chloro-1,3-dihydro-5-(o-nitrophenyl)-2H-thieno[2,3-e][1,4]diazepin-2-one as the active ingredient can be prepared using methods analogous to those described in Examples A, B and C respectively.

We claim:

1. A compound of the formula 7-chloro-1,3-dihydro-5-(o-nitrophenyl)-2H-thieno[2,3-e][1,4]diazepin-2-one.

2. A compound of the formula 7-chloro-1,3-dihydro-1-methyl-5-(o-nitrophenyl)-2H-thieno[2,3-e][1,4]diazepin-2-one.

3. A compound of the formula 1,3-dihydro-1-methyl-5-(o-nitrophenyl)-2H-thieno-[2,3-e][1,4]diazepin-2-one.

4. A compound of the formula 1,3-dihydro-5-(o-nitrophenyl)-2H-thieno[2,3-e][1,4]diazepin-2-one.

* * * * *